(12) United States Patent
Kitagawa

(10) Patent No.: US 7,737,971 B2
(45) Date of Patent: Jun. 15, 2010

(54) IMAGE DRAWING DEVICE, VERTEX SELECTING METHOD, VERTEX SELECTING PROGRAM, AND INTEGRATED CIRCUIT

(75) Inventor: Daisaku Kitagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 627 days.

(21) Appl. No.: 11/630,026

(22) PCT Filed: Jun. 27, 2005

(86) PCT No.: PCT/JP2005/011708

§ 371 (c)(1),
(2), (4) Date: Jan. 3, 2007

(87) PCT Pub. No.: WO2006/003856

PCT Pub. Date: Jan. 12, 2006

(65) Prior Publication Data
US 2007/0229494 A1    Oct. 4, 2007

(30) Foreign Application Priority Data
Jul. 1, 2004   (JP) ............................. 2004-195188

(51) Int. Cl.
*G06T 17/20*   (2006.01)
*G06T 15/00*   (2006.01)
(52) U.S. Cl. ...................................... 345/423; 345/419
(58) Field of Classification Search .................. None
See application file for complete search history.

(56) References Cited

U.S. PATENT DOCUMENTS

| | | | | |
|---|---|---|---|---|
| 5,999,199 A | * | 12/1999 | Larson | ....................... 345/531 |
| 6,246,418 B1 | | 6/2001 | Oka | |
| 6,819,334 B1 | * | 11/2004 | Owada et al. | ................ 345/659 |
| 7,042,452 B1 | * | 5/2006 | Wasserman et al. | ......... 345/423 |
| 7,081,903 B2 | * | 7/2006 | McNamara et al. | ......... 345/614 |
| 7,148,890 B2 | * | 12/2006 | Rice et al. | ..................... 345/427 |
| 2001/0048435 A1 | | 12/2001 | Deering et al. | |
| 2003/0095124 A1 | * | 5/2003 | Tjandrasuwita | ............. 345/538 |
| 2004/0012586 A1 | | 1/2004 | Inada et al. | |
| 2004/0196285 A1 | * | 10/2004 | Rice et al. | .................... 345/423 |

FOREIGN PATENT DOCUMENTS

| | | |
|---|---|---|
| JP | 09-305776 | 11/1997 |
| JP | 2001-067491 | 3/2001 |
| JP | 2002-503855 | 2/2002 |
| JP | 2003-263650 | 9/2003 |
| JP | 2003-317113 | 11/2003 |

\* cited by examiner

*Primary Examiner*—Daniel F Hajnik
(74) *Attorney, Agent, or Firm*—Wenderoth, Lind & Ponack, L.L.P.

(57) ABSTRACT

The present invention provides a dividing method taking, into consideration, memory access when determining vertices of polygons created through division in an image rendering apparatus for rendering a 3-dimensional image with polygons, in which a polygon is divided into smaller polygons in order to improve the representational power of an image. The image rendering apparatus according to the present invention can write pixel data for an image that is to be displayed to a frame memory in the unit of a predetermined number of pixels. The image rendering apparatus selects vertices of polygons created through division such that the vertices are at the first pixel or the last pixel in the writing pixel unit.

12 Claims, 14 Drawing Sheets

FIG.4

| X | Y | Z |
|---|---|---|
| 88 | 645 | 886 |
| 129 | 71 | 2105 |
| 256 | 151 | 221 |
| 379 | 890 | 1565 |
| 445 | 294 | 1277 |
| 588 | 482 | 867 |
| 611 | 556 | 1156 |
| 720 | 49 | 1679 |
| 833 | 960 | 1830 |
| 952 | 743 | 961 |
| ⋮ | ⋮ | ⋮ |

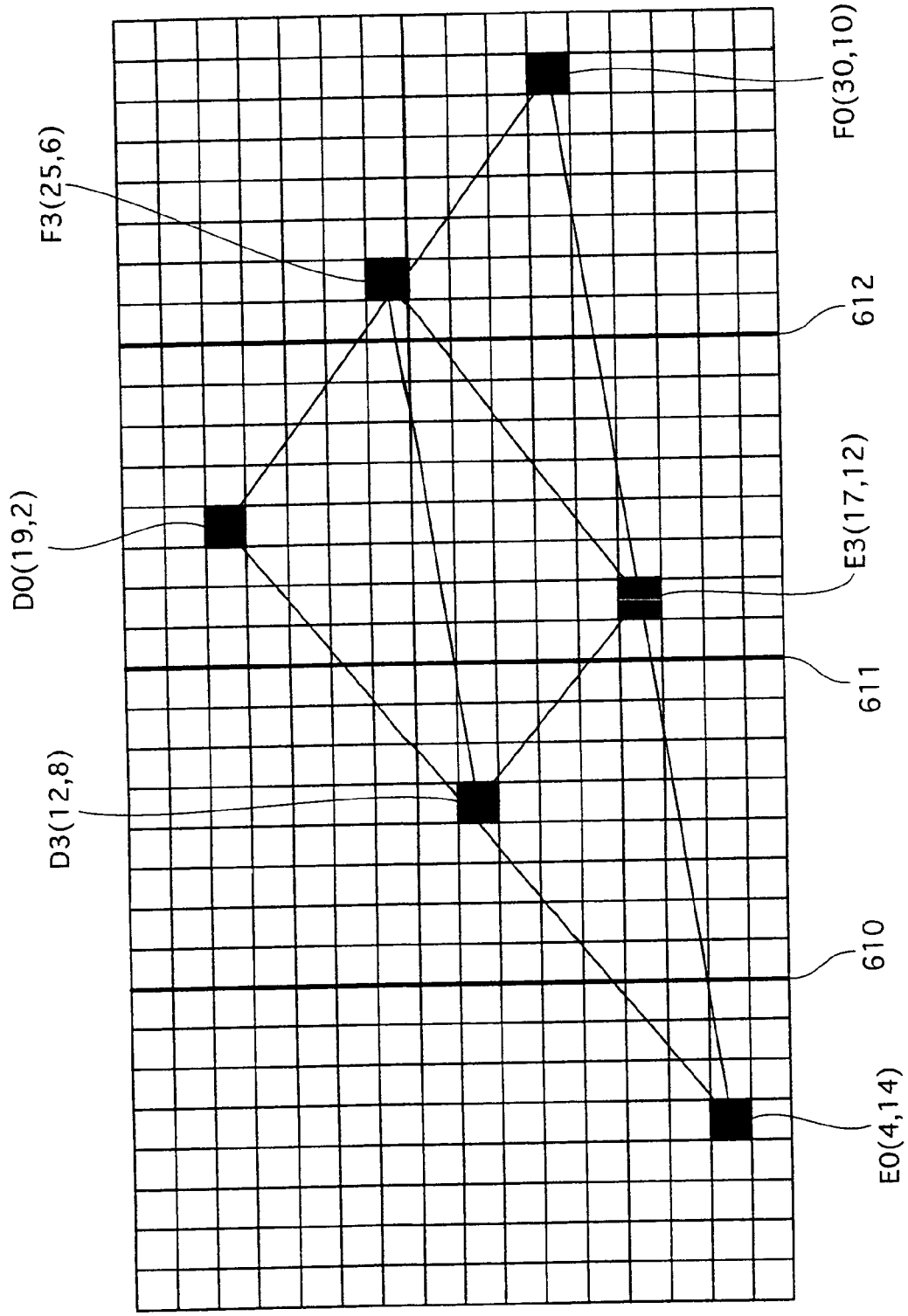

IMAGE DRAWING DEVICE, VERTEX SELECTING METHOD, VERTEX SELECTING PROGRAM, AND INTEGRATED CIRCUIT

TECHNICAL FIELD

The present invention relates to an image rendering apparatus for displaying a 3-dimensional polygon image, and in particular, relates to a technique for displaying an image with re-divided polygons.

BACKGROUND ART

In recent years, in image rendering apparatuses using real-time 3DCG (3-dimension computer graphics), the number of polygons displayed and the representational power have been significantly improved. A "polygon" basically refers to a polygonal figure, but often refers to a triangle or a quadrangle in the domain of 3DCG. In 3DCG, the shape of an object is represented by combining a large number of polygons. As these polygons are smaller, that is, as the number of the polygons displayed is larger, a smoother and more detailed 3-dimensional image can be represented.

In image rendering apparatuses using 3DCG, generally, a GE (graphics engine) creates data for an image that is to be actually displayed on a display, based on an instruction from a CPU (central processing unit). It is the GE that creates image data for the following reason. If the CPU computes an image that changes in animation or the like and gives an instruction to the GE, then the CPU sends the GE data indicating information such as the color of each pixel of each position. Thus, the amount of data transferred is increased, so that there may be a delay in displaying the image.

Thus, the CPU gives the GE only a simple instruction, for example, to render, in red, a triangle connecting three points A, B, and C on the surface of an object. Then, the GE computes each pixel data within the triangle, and stores pixel data representing red in each pixel position in a frame memory corresponding to the internal portion of the triangle. By distributing the process between the CPU and the GE, a delay in displaying an image can be avoided to the extent possible. The triangle ABC may have a curved face. In this case, in order to achieve smooth representation, the GE may divide the given triangle into a plurality of triangles, and creates pixel data for each of the triangles. Examples of the dividing technique include a so-called subdivision surface. In the subdivision surface, an original polygon is represented in more detail using polygons created through the division.

As an example of the dividing method for dividing a polygon, Patent Document 1 has disclosed a technique for selecting interpolation points for dividing a polygon based on the shape of an original polygon. For example, the middle points of sides constituting a polygon are selected, and then the polygon is divided by line segments formed by connecting the middle points.

The GE writes pixel data of each of the divided polygons to a frame memory. A display reads out the data in the frame memory and displays an image. The GE writes pixel data to the frame memory in the unit of a predetermined number of pixels. Furthermore, the GE re-renders the image in the unit of a polygon. Thus, the GE can re-render the image by rewriting only a portion that has been changed.

Patent Document 1: Japanese Patent Application Publication No. 2001-67491

DISCLOSURE OF THE INVENTION

The Problems the Invention is Going to Solve

In conventional examples, division points are determined based on the shape of an original polygon as shown in Patent Document 1. This method has an advantage in that the division points can be easily determined. However, the rendering performance, in particular, the rendering speed may be lowered, because this method divides a polygon regardless of the efficiency in accessing the frame memory.

Thus, it is an object of the present invention to provide an image rendering apparatus that can determine division points while suppressing a decrease in the rendering performance.

An image rendering apparatus of the present invention for rendering an object specified by a data group using computer graphics, the image rendering apparatus extracting a position component and another component with respect to each of a plurality of pieces of data of the data group, the position component being obtained through projection onto a 2-dimensional plane, the other component specifying a rendering condition, and rendering a plurality of polygons having vertices specified by the position component of the data in the rendering condition on an image plane, the rendering condition being specified by the other component for specifying the rendering condition for the data, comprises: a frame memory for storing pixel data values of pixels on the 2-dimensional plane; a writing unit having a function to write pixel data to the frame memory in order to render an image, wherein the pixel data is written to a predetermined number of pixels simultaneously at a time, the frame memory being divided into sections each constituted by the predetermined number of pixels; and a data selecting unit for selecting the plurality of pieces of data such that at least one vertex of each polygon is positioned at a first pixel or a last pixel in the sections.

"Other components" herein refers to components other than a position component in 2 dimensions, and may be a position component in 3 dimensions, that is, a height component, or a color component.

Accordingly, with this image rendering apparatus, at least one vertex of a polygon can be positioned at the first pixel or the last pixel in successive pixels whose data can be written at a time to the frame memory. Thus, a decrease in the rendering speed can be suppressed. The reason for this is as follows. Pixel data is written to the frame memory in a predetermined pixel unit. If a vertex is positioned midway in the writing unit, then the vertex is shared by a plurality of polygons, and therefore in a writing pixel area including the vertex, pixel data is written for each of polygons having this point as a vertex thereof. Thus, the frame memory is accessed in an overlapped manner at this area. When the overlapped accesses are suppressed to the extent possible, the number of accesses to the frame memory is reduced. Thus, a deterioration in the rendering property can be suppressed.

The image rendering apparatus may further comprise an initial data selecting unit for selecting data for vertices of a polygon regardless of the first pixel or the last pixel in the sections, wherein when the data selecting unit selects data such that at least two small polygons constitute an original polygon, the original polygon being formed by data that has been selected by the initial data selecting unit, the data selecting unit selects data for vertices of the small polygons such that at least one of the vertices constituting the small polygons is positioned at a first pixel or a last pixel in the sections, and is positioned on a side constituting the original polygon.

Accordingly, the image rendering apparatus can express an original polygon with a plurality of polygons created by dividing the original polygon. Thus, the image rendering apparatus can achieve smoother representation of the original polygon. Furthermore, the plurality of polygons have at least one vertex that is positioned on a side of the original polygon. Thus, the pixel position of a vertex can be easily determined.

The data selecting unit may select data for vertices such that one vertex of one small polygon and one vertex of another small polygon are positioned respectively at the first pixel and the last pixel in the adjacent sections, the vertices being in contact with each other.

Accordingly, a vertex is shared by small polygons that are adjacent to each other, for example. Thus, a decrease in the access efficiency can be prevented in the small polygon on one side.

The data selecting unit may select data for one vertex of the small polygons such that the vertex is in the vicinity of the middle point of a side of the original polygon, the vertex being present on the side.

Accordingly, in the image rendering apparatus, one vertex of each polygon created through division is positioned in the vicinity of the middle point of the original polygon. Thus, the image rendering apparatus can divide a polygon into polygons as equivalent as possible. Furthermore, the image rendering apparatus can create an image as uniform and smooth as possible.

The data selecting unit may select data for vertices such that at least two vertices are positioned both at first pixels or last pixels in the sections, such that if the two vertices are positioned at first pixels, then all pixels on a line segment formed by connecting the two vertices are positioned at first pixels, and such that if the two vertices are positioned at the last pixels, then all pixels are positioned at last pixels.

Accordingly, vertices can be determined so as to further improve the efficiency with which the GE accesses the frame memory. When the access efficiency is improved, further improvement in the rendering speed can be expected.

It is also possible that the original polygon is a triangle, and the data selecting unit selects data for one point on each side constituting the triangle, that is, three points in total, and divides the original triangle by line segments formed by connecting two points among the three points, so that four triangles created through the division constitute the original triangle Accordingly, in the image rendering apparatus, a triangle, which is one of typical shapes in 3DCG, can be taken as a control shape. Thus, the image rendering apparatus can render an image using points on sides of the original triangle as vertices of newly divided triangles. When the points on the sides are taken as division points, it is possible to easily divide the triangle and to easily render the image. A triangle is often taken as a control shape also in conventional examples. Thus, this configuration can be easily used for conventional equipment.

It is also possible that the original polygon is a quadrangle, and the data selecting unit selects data for one point on each side constituting the original quadrangle, that is, four points in total, and data for one point inside the original quadrangle, and divides the original quadrangle by line segments formed by connecting the one point and the four points, so that four quadrangles created through the division constitute the original quadrangle.

Accordingly, in the image rendering apparatus, a quadrangle, which is one of typical shapes in 3DCG, can be taken as a control shape. Thus, the image rendering apparatus can control points on sides of the original quadrangle and one point inside the quadrangle as vertices of new quadrangles. When the vertices are positioned on the sides of the quadrangle, it is possible to easily divide the quadrangle and to easily process the quadrangle because of its shape. As in the case of a triangle, a quadrangle is often taken as a control shape in conventional examples. Thus, this configuration can be easily used for conventional equipment.

The predetermined number of pixels may be obtained by dividing the number of signal lines by the number of data bits constituting one pixel, the signal lines being connected to the frame memory and used for inputting and outputting data.

Accordingly, the predetermined number of pixels can be determined based on the number of signal lines that are connected from the GE to the frame memory in the image rendering apparatus, and the number of data bits for one pixel. Thus, the positions of the first pixel and the last pixel in one section can be calculated based on the predetermined number of pixels.

In a case where data is written to the frame memory using burst transfer, the predetermined number of pixels may be obtained by dividing the number of bits in the unit of data that is to be transferred in the burst transfer, by the number of bits per pixel.

Accordingly, the predetermined number of pixels can be determined by dividing the burst transfer data amount by the data amount necessary to transfer for one pixel, the burst transfer data amount being the amount of data burst-transferred at a time in the burst transfer. Thus, the positions of the first pixel and the last pixel in one section can be calculated based on the predetermined number of pixels.

Furthermore, a method for selecting a vertex of a polygon of the present invention in an image rendering apparatus for rendering an object specified by a data group using computer graphics, the image rendering apparatus extracting a position component and another component with respect to each of a plurality of pieces of data of the data group, the position component being obtained through projection onto a 2-dimensional plane, the other component specifying a rendering condition, and rendering a plurality of polygons having vertices specified by the position component of the data in the rendering condition on an image plane, the rendering condition being specified by the other component for specifying the rendering condition for the data, wherein the image rendering apparatus comprises a frame memory and a writing unit, the frame memory being for storing pixel data values of pixels on the 2-dimensional plane, and the writing unit having a function to write pixel data to the frame memory in order to render an image, wherein the pixel data is written to a predetermined number of pixels simultaneously at a time, the frame memory being divided into sections each constituted by the predetermined number of pixels, is characterized in that the method for selecting a vertex comprises a data selecting step of selecting the plurality of pieces of data such that at least one vertex of each polygon is positioned at a first pixel or a last pixel in the sections.

With this method, the image rendering apparatus can determine one vertex of each polygon.

Furthermore, a program for selecting a vertex of the present invention, executed by a CPU mounted on an image rendering apparatus for rendering an object specified by a data group using computer graphics, the image rendering apparatus extracting a position component and another component with respect to each of a plurality of pieces of data of the data group, the position component being obtained through projection onto a 2-dimensional plane, the other component specifying a rendering condition, and rendering a plurality of polygons having vertices specified by the position component of the data in the rendering condition on an image plane, the rendering condition being specified by the other component for specifying the rendering condition for the data, wherein the image rendering apparatus comprises a frame memory and a writing unit, the frame memory being for storing pixel data values of pixels on the 2-dimensional plane, and the writing unit having a function to write pixel data to the frame memory in order to render an image, wherein the pixel data is written to a predetermined number of pixels simultaneously at a time, the frame memory being divided into sections each constituted by the predetermined number of pixels, is characterized in that a procedure for selecting a vertex in the program comprises a data selecting step of selecting the plurality of pieces of data such that at least one vertex of each polygon is positioned at a first pixel or a last pixel in the sections.

Accordingly, the CPU in the image rendering apparatus can determine one vertex of each polygon, by reading and executing this program.

Furthermore, an integrated circuit for selecting a vertex of the present invention for rendering an object specified by a data group using computer graphics, the integrated circuit extracting a position component and another component with respect to each of a plurality of pieces of data of the data group, the position component being obtained through projection onto a 2-dimensional plane, the other component specifying a rendering condition, and rendering a plurality of polygons having vertices specified by the position component of the data in the rendering condition on an image plane, the rendering condition being specified by the other component for specifying the rendering condition for the data, comprises: a frame memory for storing pixel data values of pixels on the 2-dimensional plane; a writing unit having a function to write pixel data to the frame memory in order to render an image, wherein the pixel data is written to a predetermined number of pixels simultaneously at a time, the frame memory being divided into sections each constituted by the predetermined number of pixels; and a data selecting unit for selecting the plurality of pieces of data such that at least one vertex of each polygon is positioned at a first pixel or a last pixel in the sections.

The image rendering apparatus on which this integrated circuit is mounted can determine one vertex of each polygon.

BRIEF DESCRIPTION OF THE DRAWINGS

FIG. 4 is a diagram showing data in 3 dimensions.

FIG. 7 is a diagram in which the polygon has been divided using a conventional dividing method.

DESCRIPTION OF CHARACTERS

| | |
|---|---|
| 100 | image rendering apparatus |
| 110 | CPU |
| 120 | PE |
| 130 | frame memory |
| 140 | display device |
| 220, 221, and 222 | boundary |
| 400 | data table |

BEST MODE FOR CARRYING OUT THE INVENTION

Embodiment

Hereinafter, an image rendering apparatus according to the present invention is described with reference to the drawings.

<Configuration>

Figure 1:
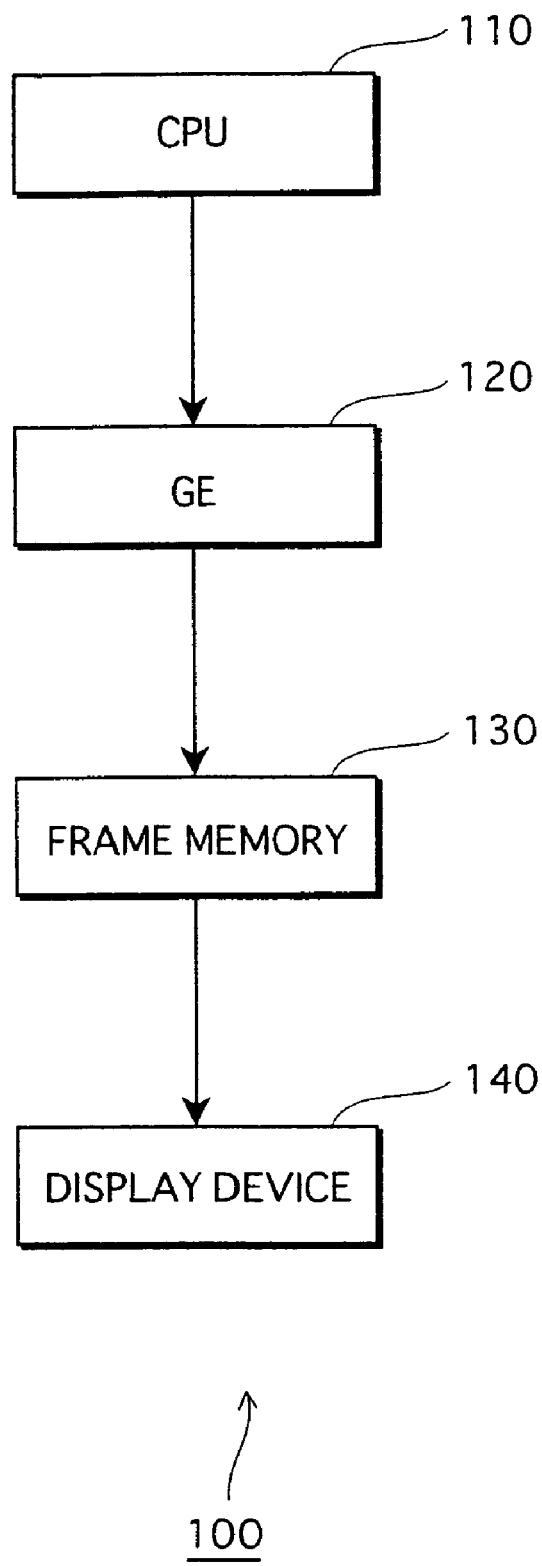
FIG. 1 is a block diagram showing the functional configuration of an image rendering apparatus according to the present invention.

FIG. 1 is a functional block diagram showing the functional configuration of an image rendering apparatus 100 according to the present invention.

As shown in FIG. 1, the image rendering apparatus 100 includes a CPU 110, a GE 120, a frame memory 130, and a display device 140.

The CPU 110 has a function to transmit, to the GE, main data of an image that is to be displayed.

The GE 120 has a function to perform computation for obtaining pixel data of the image that is to be rendered, based on the instruction from the CPU 110, and to write the pixel data to the frame memory 130. The GE 120 has properties similar to those of conventional graphic engines. The GE 120 writes the pixel data to the frame memory 130 in the unit of a predetermined number of pixels. In this specification, the predetermined number of pixels is eight. The number of pixels is determined based on the number of bus lines connecting the GE 120 and the frame memory 130, and the number of data bits per pixel. For example, if the number of bus lines is 64, and the number of data bits per pixel is eight, then the number of pixels whose data can be written at a time is eight. The frame memory 130 will be described later in detail.

The GE 120 may divide a polygon given from the CPU 110 into smaller polygons in order to represent in more detail an object that is to be displayed. In this case, the GE 120 determines vertices of the new polygons created through the division. The GE 120 according to the present invention is different from conventional GEs in a method for determining vertices of the new polygons created through the division.

The method for determining vertices will be described later as the operation of the image rendering apparatus 100.

As described above, the GE 120 also has a function to perform computation as conventional GEs. There are various examples of the computation performed by the GE 120. Typical examples of the computation are coordinate transformation with rotation and movement, lighting, viewpoint transformation, clipping, raster conversion, hidden-surface removal, texture mapping, and filtering. The coordinate transformation with rotation and movement, the lighting, the viewpoint transformation, and the clipping are often referred to as geometry arithmetic. The raster conversion, the hidden-surface removal, the texture mapping, and the filtering are often referred to as rendering.

Hereinafter, each of the computations is briefly described.

The lighting is a process to determine the color, which changes depending on how light is cast thereon.

The viewpoint transformation is a process to calculate distortion of an object that is to be displayed, when viewed from an external point.

The clipping is a process to delete data of a portion that is not seen on a displayed screen.

The raster conversion is a process to perform computation in which a 3-dimensional polygon is projected onto a 2-dimensional plane.

The hidden-surface removal is a process to perform computation in which a portion hidden by the front face of an object is removed.

The texture mapping is a process to attach image data representing a pattern to the surface of an object.

The filtering is a process to perform computation in which a rough contour of a polygon is made smooth.

The frame memory 130 has a function to store pixel data of an image that is to be displayed. An image is displayed using pixel data that is stored in the frame memory 130. Basically, the GE 120 writes pixel data to the frame memory 130 in the unit of a predetermined number of pixels. In this specification, the predetermined number of pixels is eight, as described above.

Figure 2:
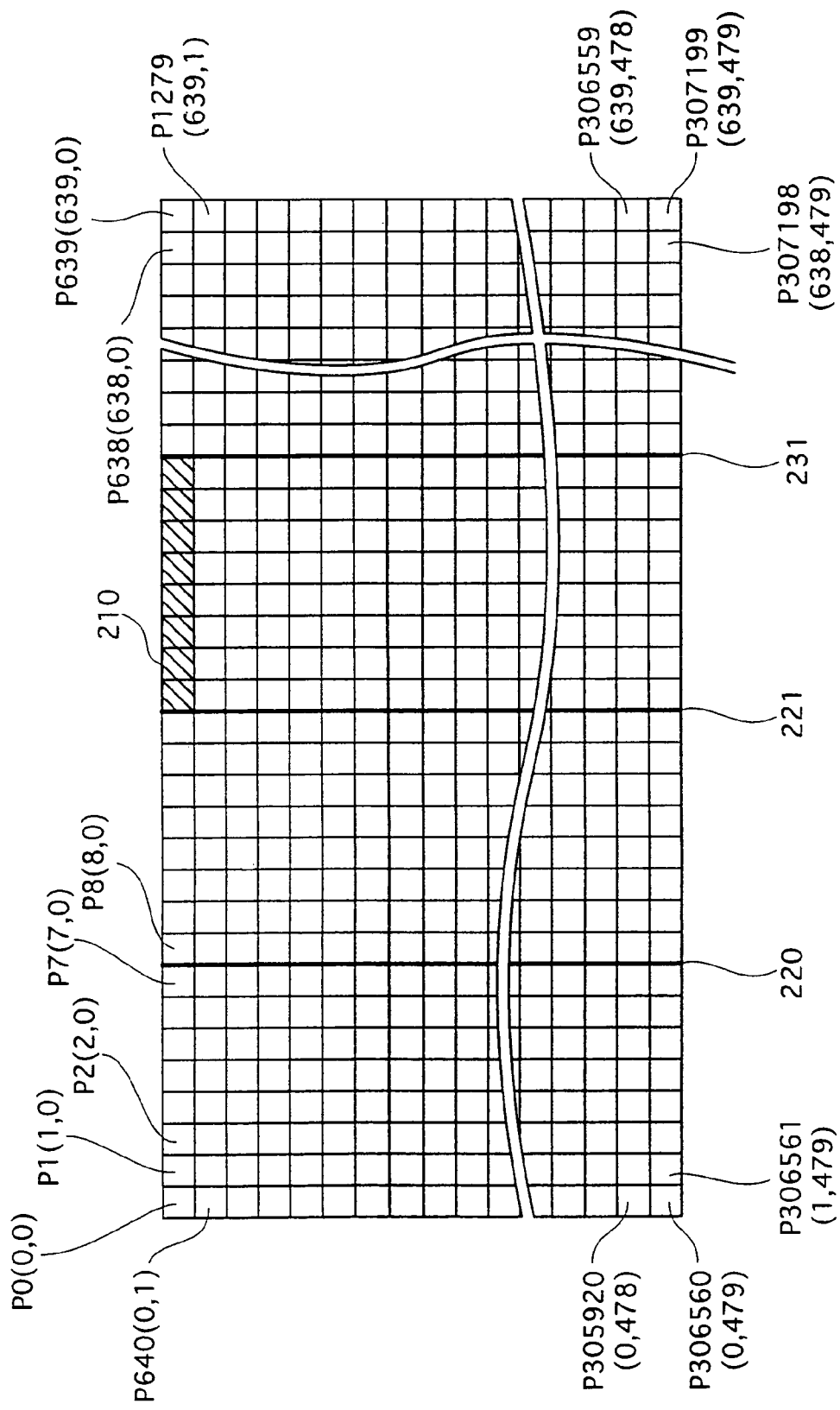
FIG. 2 is a conceptual diagram of a storage area in a frame memory of the image rendering apparatus according to the present invention.

FIG. 2 shows an image diagram of a data storage area in the frame memory 130. As shown in FIG. 2, the frame memory 130 is a RAM (random access memory) that stores pixel data in a 2-dimensional array. More specifically, the frame memory 130 is constituted by an SDRAM (synchronous dynamic random access memory).

The coordinate system of the frame memory 130 is set so as to correspond to the display position of the display device 140. Herein, it is assumed that the frame memory 130 can store 640×480 pixels. The coordinates (horizontal position, vertical position) of the first pixel are pixel P0(0, 0). The next pixel is pixel P1(1, 0), and the following pixel is pixel P2(2, 0). The last pixel of the first row is P639(639, 0).

The first pixel of the second row is P640(0, 1). The following pixels are sequentially arranged. The first pixel of the last row is P306560(0, 479). The next pixel is P305451(1, 479). The last pixel in the frame memory 130 is P307199(639, 479). In this manner, pixel data is stored in the order from left to right and from up to down. The coordinates of the pixel data correspond to the coordinates of the display position of the display device 140.

The GE 120 sequentially rewrites pixel data to the frame memory 130. The GE 120 writes pixel data in the unit of eight pixels. The pixel data for eight pixels is written at a time in the horizontal direction as shown in a hatched portion 210. More specifically, the GE 120 accesses the frame memory 130 in the unit of eight pixels in the horizontal direction, that is, [P0(0, 0), P1(1, 0), (, P6(6, 0), P7(7, 0)], [P8(8, 0), P9(9, 0), (, P14(14, 0), P15(15, 0)], [P632(632, 0), P633(633, 0), (, P638(638, 0), P639(639, 0)], [P640(0, 1), P641(1, 1), (, P646(6, 1), P647(7, 1)], (, [P1272(632, 1), P1273(633, 1), (, P1278(638, 1), P1279(639, 1)], (, [P305920(0, 478), P305921(1, 478), (, P305926(6, 478), P305927(7, 478)], (, [P306560(0, 479), P306561(1, 479), (, P306566(6, 479), P306567(7, 479)], (, and [P307192(632, 478), P307193(633, 478), (, P307198(638, 478), P307199(639, 478)]. The number of pixels in the brackets is eight. When the GE 120 writes pixel data in the unit of eight pixels, line segments serving as boundaries between the eight pixel units are formed in the frame memory 130. Hereinafter, the line segments are referred to as boundaries. In FIG. 2, bold lines 220, 221, and 222 correspond to the boundaries.

The display device 140 has a function to sequentially read out data from the frame memory 130, and to display the data contents as an image. The display device 140 is realized as an LCD (liquid crystal display) or a plasma display, for example.

<Data>

Herein, data that is processed by the image rendering apparatus 100 is described.

Figure 3:
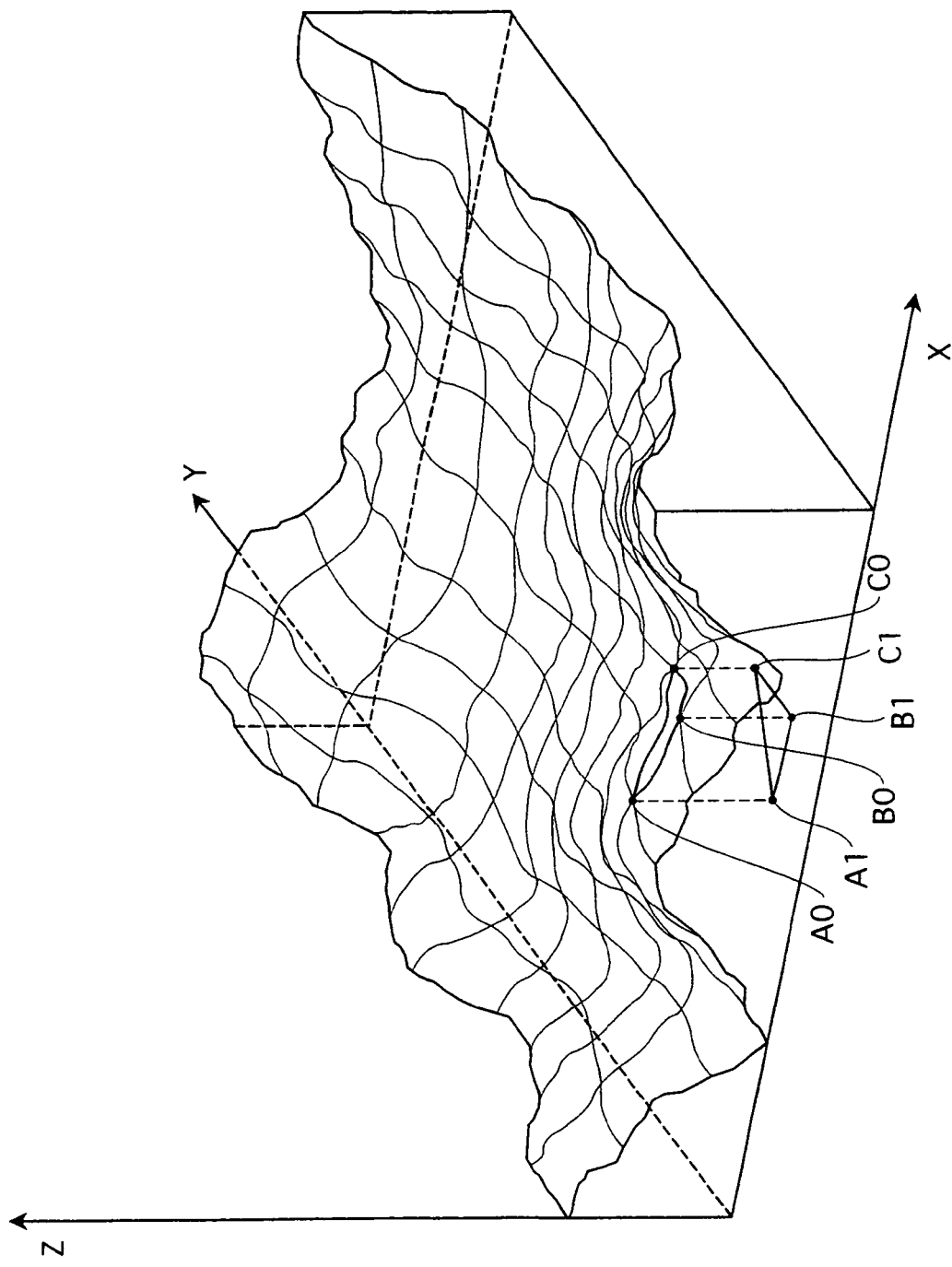
FIG. 3 is a conceptual diagram showing a manner in which a 3-dimensional object is projected onto 2 dimensions.

FIG. 3 shows one example in which original data that is to be rendered by the image rendering apparatus 100 is 3-dimensionally represented. This 3-dimensional structure in 3 dimensions is projected onto a 2-dimensional plane, and is displayed on the display device.

FIG. 3 shows a type of topography as one example of a 3-dimensional diagram. FIG. 3 shows that a triangle A1B1C1 is formed, if a figure A0B0C0 is projected onto a 2-dimensional plane, the figure A0B0C0 being formed by data of the coordinates of three points A0, B0, and C0, among data for the surface of this topography. An object that has been projected onto a 2-dimensional plane is displayed on the display device.

Data as shown in FIG. 3 is a collection of data of the coordinates as shown in FIG. 4. A coordinate table 400 shown in FIG. 4 includes x-axis data 401, y-axis data 402, and z-axis data 403. The x-axis data 401, the y-axis data 402, and the z-axis data 403 are data respectively indicating the coordinate components.

The coordinate table 400 lists only coordinate data on each of the x-axis, the y-axis, and the z-axis. However, the coordinate table 400 may hold various types of data such as color data, pattern data, and light source data.

<Operation>

Hereinafter, the operation of the image rendering apparatus 100 is described.

Figure 5:
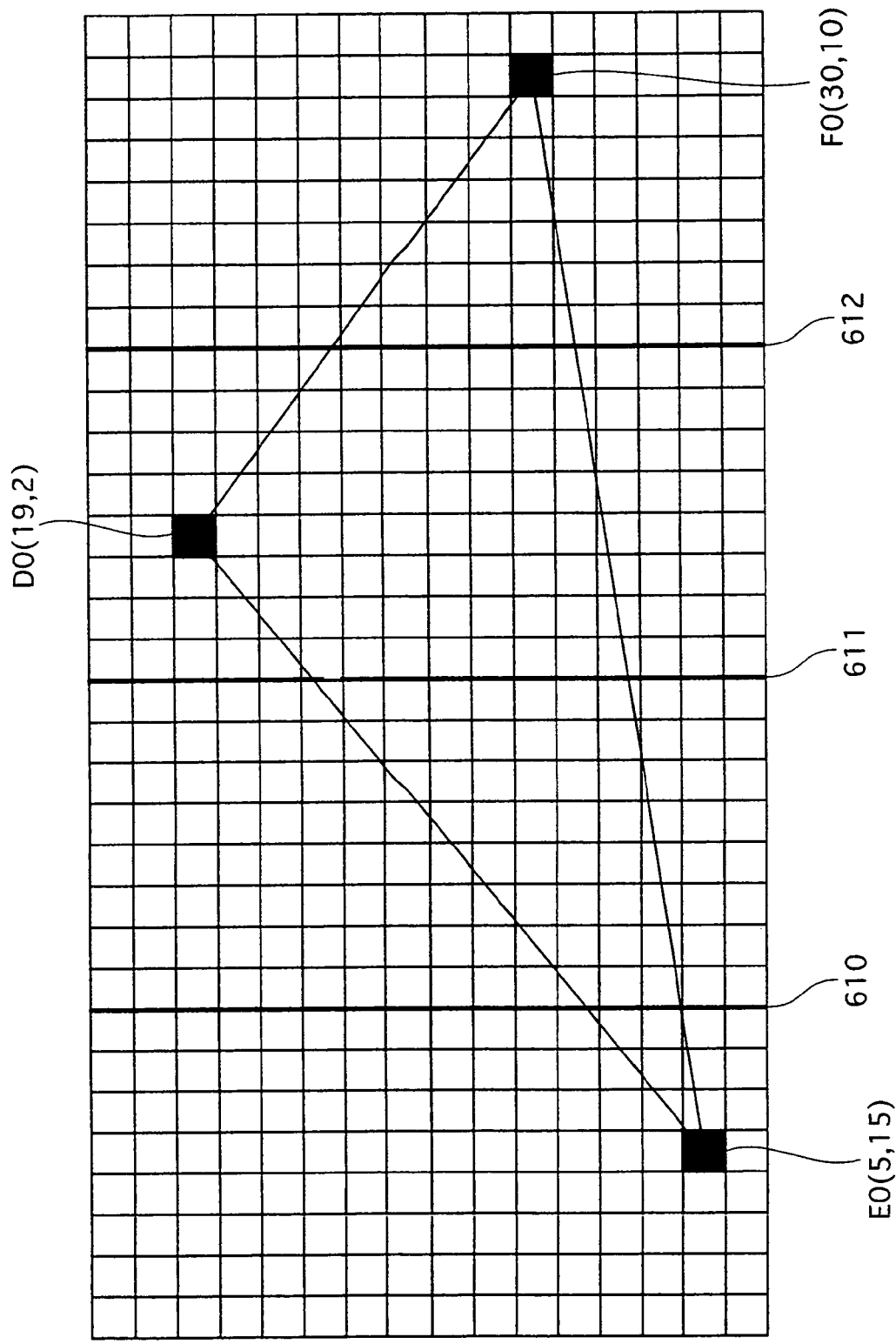
FIG. 5 is a schematic diagram of a state in which data of a polygon is stored in the frame memory based on an instruction to render the polygon, the instruction being given from a CPU to a GE.
Figure 6:
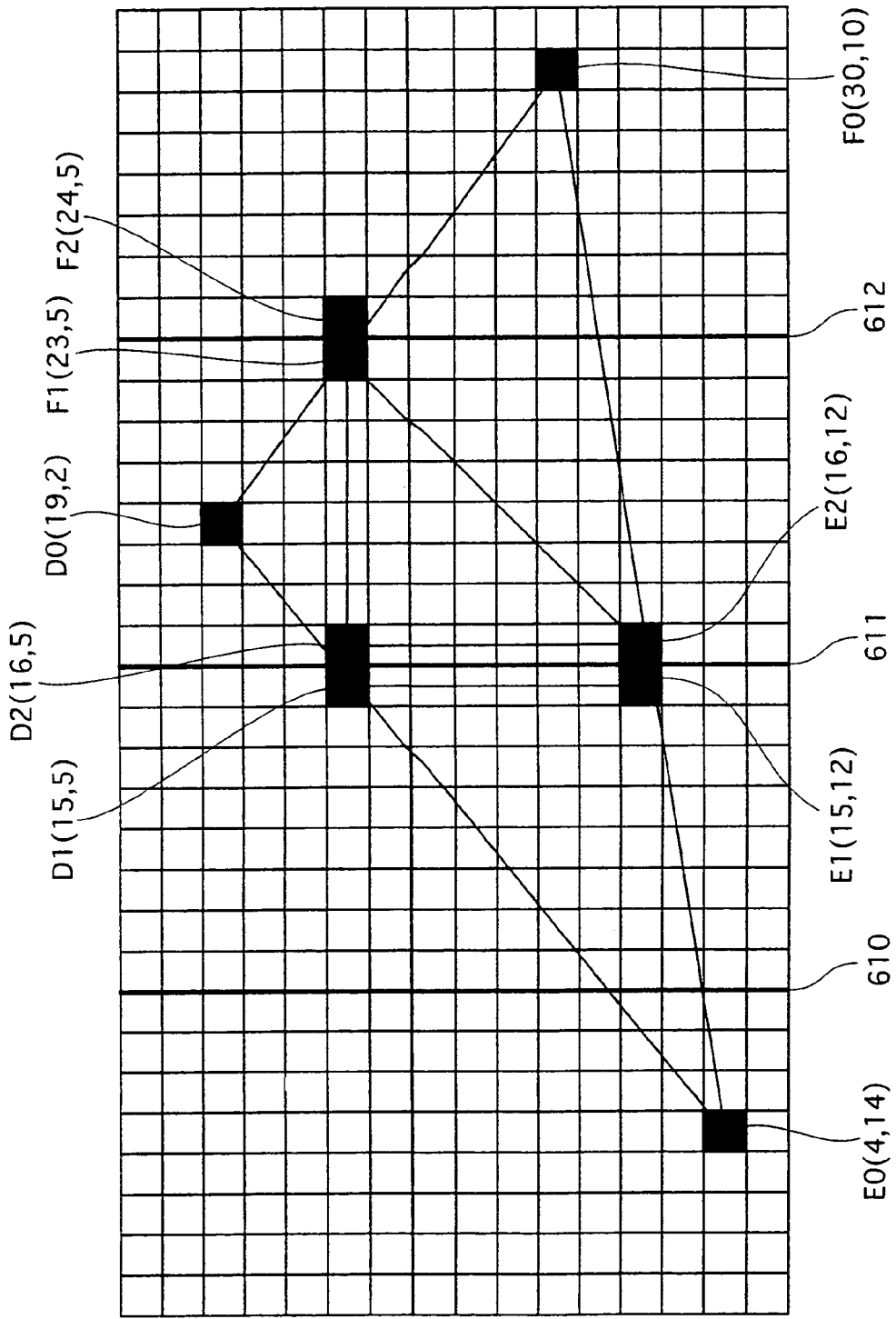
FIG. 6 is a diagram in which the polygon has been divided using a dividing method according to the present invention.
Figure 8A:
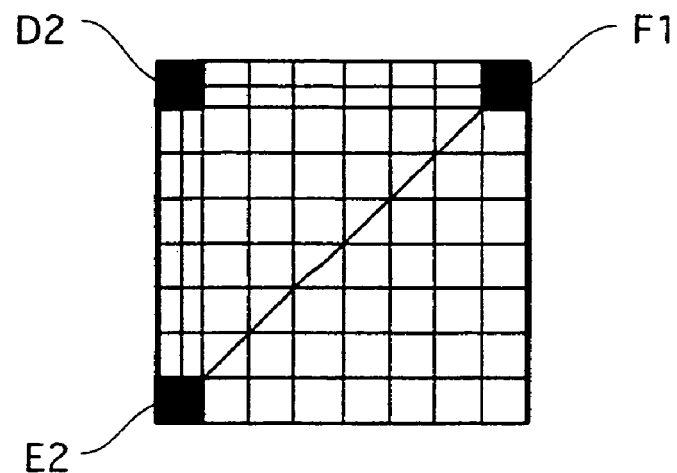
FIGS. 8A and 8B are diagrams showing the amount of access to the frame memory with respect to the divided triangles.
Figure 8B:
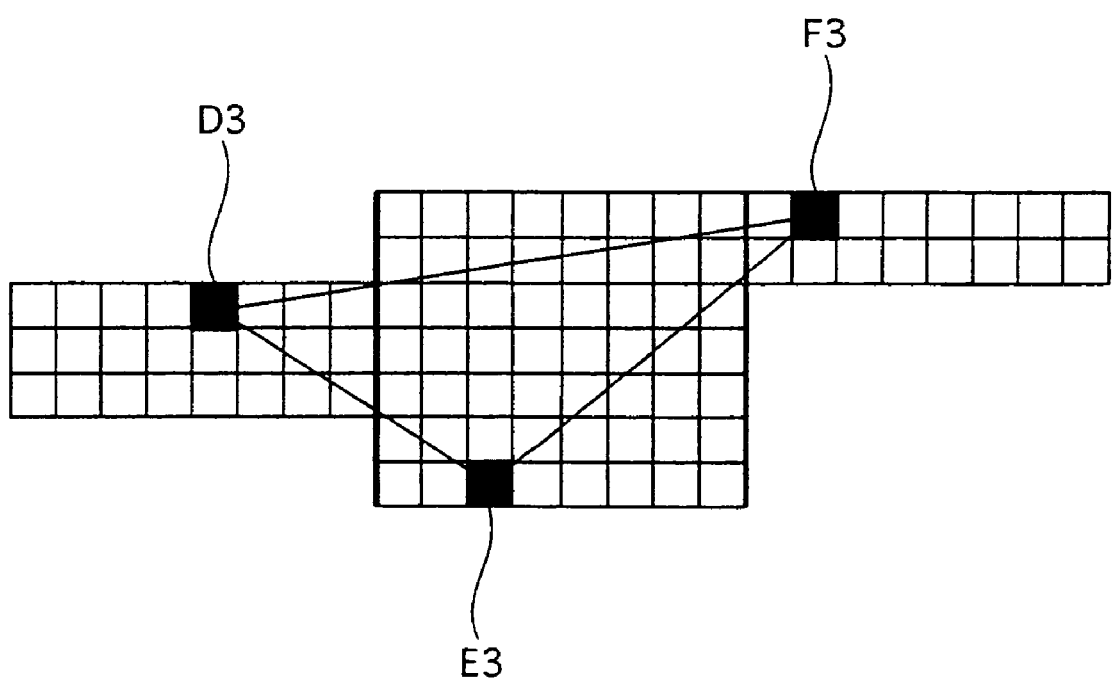

FIG. 5 shows a polygon that is given by the CPU 110 to the GE 120. A general operation for dividing the polygon into polygons as shown in FIG. 6 is described using flowcharts shown in FIGS. 9 and 10. FIG. 7 shows an example in which the polygon has been divided in a conventional manner for the sake of comparison. FIGS. 8A and 8B are diagrams for illustrating an access unit. First, the general operation is described with reference to FIGS. 9 and 10. Then, a specific dividing operation and a difference between this operation and a conventional operation are described with reference to FIGS. 5 to 8B.

A method for rendering a 3-dimensional image in the image rendering apparatus 100 follows a method of a conventional rendering apparatus for rendering a 3-dimensional image, and the description thereof has been omitted. Herein is described the operation of the image rendering apparatus 100 in a method for determining vertices of polygons created through division, by which the present invention is characterized.

Figure 9:
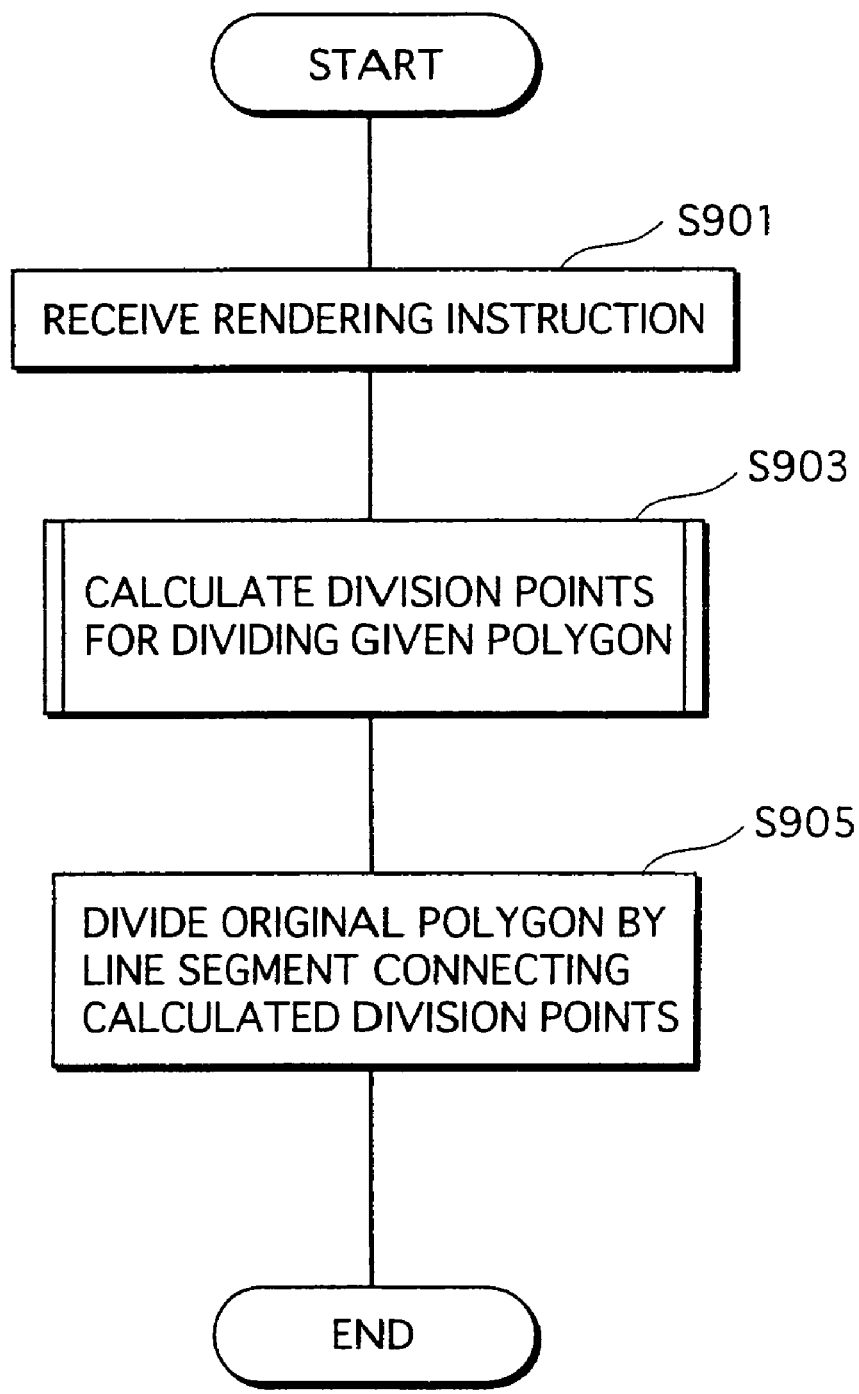
FIG. 9 is a flowchart showing the operation of the image rendering apparatus according to the present invention.

FIG. 9 is a flowchart showing the operation of the GE 120 of the image rendering apparatus 100 according to the present invention.

As shown in FIG. 9, the GE 120 receives, from the CPU 110, a rendering instruction based on data that has been picked up from a data group as shown in FIG. 4 (step S901). Based on the received rendering instruction, the GE 120 calculates division points for dividing the polygon based on the polygon data (step S903). The method for calculating the division points in step S903 will be described later in detail with reference to FIG. 10.

The GE 120 divides the original polygon by line segments connecting the calculated division points (step S905). At that time, a left or right pixel of an intersecting point between a side forming the original polygon and a boundary serves as a division point. Thus, it is necessary to select one of the left and right pixels as the division point. The GE 120 divides the polygon such that vertices of polygons created through the division are not positioned with a boundary interposed therebetween to the extent possible. More specifically, the GE 120 divides the polygon by selecting vertices that are closer to vertices shared with the undivided polygon, among vertices of polygons created through the division.

The GE 120 calculates pixel data that is to be interpolated, for each of the polygons created through the division. Then, the GE 120 stores the pixel data into the frame memory 130. The display device 140 reads out and displays the pixel data stored in the frame memory 130.

Figure 10:
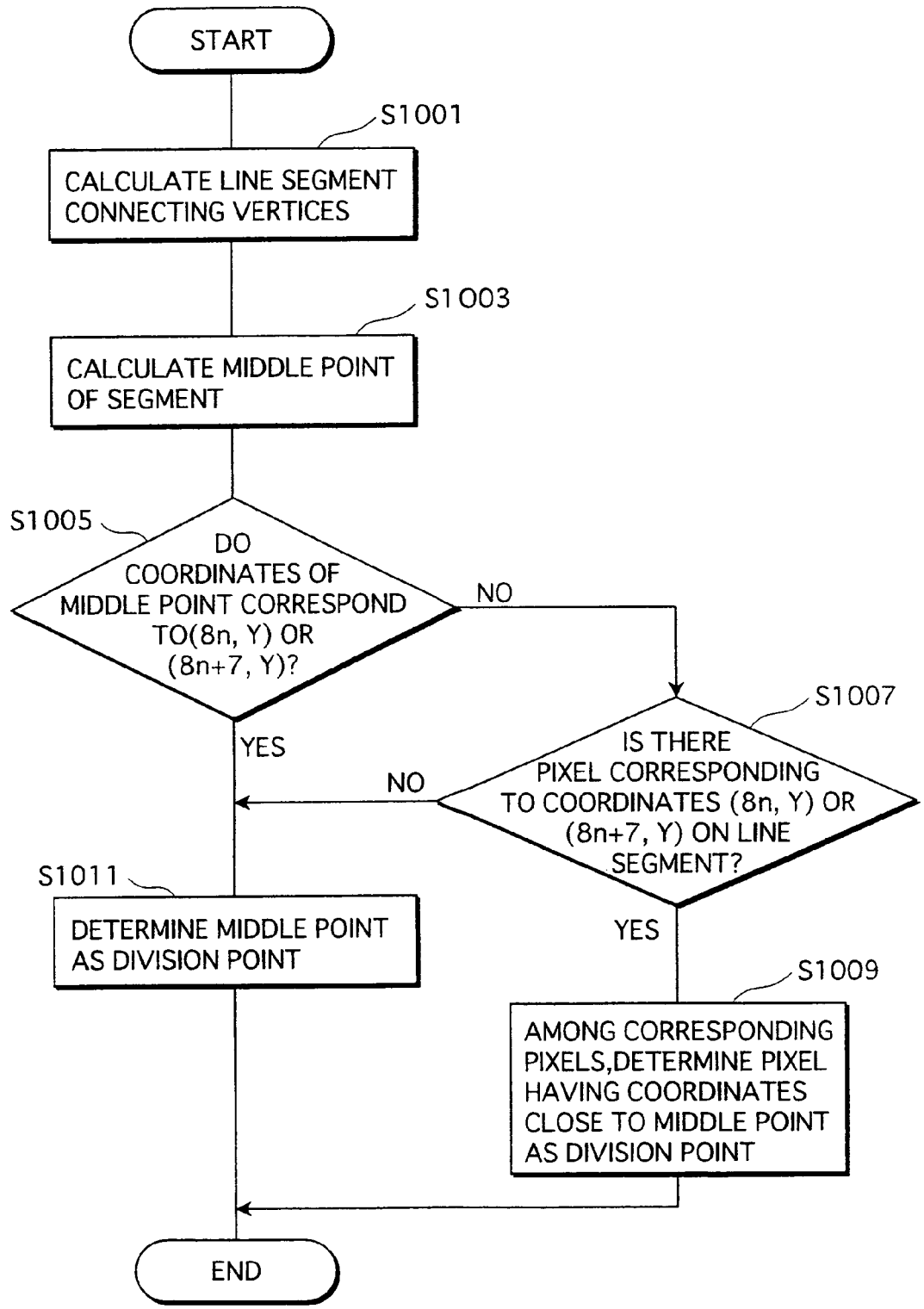
FIG. 10 is a chart regarding the position of a division point.

FIG. 10 shows the operation of the GE 120 in the image rendering apparatus 100, for calculating division points in step S903 in FIG. 9.

As shown in FIG. 10, the GE 120 calculates a line segment connecting two points based on the coordinates that has been given by the CPU 110 (step S1001). Then, the GE 120 calculates the coordinates of the middle point of the line segment (step S1003). If the coordinates of the middle point are positioned on a boundary between a pixel and a pixel, then the coordinates on the right and/or lower side thereof are taken as the coordinates of the middle point.

The GE 120 judges whether or not the middle point corresponds to the coordinates ($8n$, Y) or ($8n+7$, Y) (step S1005). Herein, n is an integer of 0 or more, and X is an arbitrary natural number. If the middle point does not correspond to these coordinates (NO in step S1005), then the GE 120 judges whether or not there is a pixel corresponding to the coordinates ($8n$, Y) or ($8n+7$, Y) among pixels on the calculated line segment (step S1007). If there is no corresponding pixel (NO in step S1007), then the GE 120 determines a pixel corresponding to the coordinates of the middle point, as one division point. Then, the GE 120 ends the procedure.

In a case where there is a corresponding pixel in step S1007 (YES in step S1007), if there are a plurality of corresponding pixels, then the GE 120 determines a pixel that is close to the middle point, as a division point (step S1009). Then, the GE 120 ends the procedure. The number of pixels that are selected herein is basically two. For example, in the triangle shown in FIG. 6, a point D1 or a point D2 serves as a division point, among the points on a side D0E0. Herein, a method for selecting division points in step S905 in FIG. 9 is described with reference to this example. In FIG. 6, division points are selected such that a new triangle including a vertex D0 is a triangle D0D2F1. Both of the point D1 and a point F2 are on a side of an original triangle D0E0F0 and are at the left or right pixel of a boundary. However, when GE 120 forms a triangle including a point D0 as one vertex, the GE 120 does not select the point D1 instead of the point D2, or the point F2 instead of a point F1 for the following reason. If the GE 120 selects the point D1 or the point F1, then the formed triangle straddles the boundary. This leads to an increase in the amount of access from the GE 120 to the frame memory 130.

Herein, the relationship between the point D1 and the point D2 described. Both of the point D1 and the point D2 are adjacent to the boundary. Thus, both of the points are pixels that are selected as division points. However, both of the points are not necessarily used as division points. Whether or not the points are used as division points depends on the shape of a new triangle created through the division. More specifically, in this case, both pixels of the point D1 and the point D2 are selected as division points. However, while the point D1 is used for writing pixel data of a triangle D1E0E1 to the frame memory, the point D2 is not used. On the other hand, while the point D2 is used for writing pixel data of a triangle D0D2F1 to the frame memory, the point D1 is not used.

Hereinafter, a method for determining division points when the triangle in FIG. 5 is divided in the manner as in FIG. 7 is described in more detail with reference to the drawings.

First, it is assumed that the CPU 110 gives the GE 120 an instruction to render, in red, a triangle connecting three points D0, E0, and F0.

Then, the GE 120 calculates a line segment connecting the two points D0 and E0. The GE 120 judges whether or not the line segment has a pixel ($8n$, Y) or ($8n+1$, Y) on the frame memory 130, that is, whether or not the line segment has an intersecting point with a boundary. In this case, the line segment D0E0 intersects boundaries 610 and 611. However, the two points D1 and D2 that are closer to the middle point serve as intersecting points.

Next, the GE 120 judges whether or not a line segment E0F0 intersects a boundary. In this case, the line segment E0F0 intersects three boundaries 610, 611, and 612. However, the GE 120 selects, as division points, two points E1 and E2 that are closer to the middle point.

Lastly, the GE 120 judges whether or not a line segment F0D0 intersects a boundary. In this case, the line segment F0D0 intersects only the boundary 612. Thus, the GE 120 determines, as division points, the two points F1 and F2 that are intersecting points between the line segment F0D0 and the boundary 612.

As a result, the GE 120 divides the original triangle D0E0F0 into four triangles, that is, a triangle D0D2F1, a triangle D1E0E1, a triangle D2E2F1, and a triangle F2E2F0, by the line segments connecting the selected division points.

<Considerations>

Herein, a specific example is described to show that there is a difference in the number of accesses between a case in which a triangle is divided using the above described method and a case using a conventional method.

A difference in the number of accesses is described with reference to FIGS. 5 to 8B.

First, a method for counting the number of accesses is described with reference to FIGS. 8A and 8B.

FIG. 8A shows the middle triangle D2E2F1, among the plurality of triangles created by dividing the original triangle D0E0F0 in FIG. 5 in the manner as in FIG. 6 based on the method according to the present invention. The GE 120 writes pixel data to the frame memory 130 in the unit of eight pixels. Thus, the GE 120 accesses the frame memory 130 approximately seven times in total in order to write the pixel data constituting the triangle D2E2F1, as shown in FIG. 8A.

FIG. 8B shows the middle triangle D3E3F3, among the triangles created by dividing the original triangle D0E0F0 in FIG. 5 in the manner as in FIG. 7 based on a conventional method. In this case, the GE 120 accesses the frame memory 130 twelve times in total in order to write the pixel data constituting the triangle D3E3F3 to the frame memory 130.

In the case where the number of accesses is counted in this manner and the triangle is divided in the manner as in FIG. 6 according to the present invention, the number of accesses for writing pixel data constituting each of the created triangles to the frame memory 130 is as follows.

| | |
|---|---|
| triangle D0D2F1: | 4 times |
| triangle D2E2F1: | 8 times |
| triangle D1E0E1: | 13 times |
| triangle F1E2F0: | 15 times |

Thus, the GE 120 accesses the frame memory 130 forty times in total for the entire triangle D0E0F0.

On the other hand, in the case where the GE120 divides the triangle at the middle points in the manner as in FIG. 7 according to the conventional method, the number of accesses for writing pixel data constituting each of the triangles created through the division to the frame memory is as follows.

| | |
|---|---|
| triangle D0D3F3: | 12 times |
| triangle D3E3F3: | 15 times |
| triangle D3E0E3: | 12 times |
| triangle F3E3F0: | 12 times |

Thus, the GE 120 accesses the frame memory 130 fifty times in total for the entire triangle D0E0F0.

As shown in the difference between the two cases described above, the number of accesses is smaller by as many as 10 times in the case where the GE 120 divides the triangle D0E0F0 based on the method according to the present invention than in the case according to the conventional method. The triangle D0E0F0 is no more than one piece in an object that is to be represented. Thus, the object is actually represented with a larger number of triangles. There is such a difference in the number of accesses for each triangle. Accordingly, it is clear that the difference between the present invention and the conventional technique becomes larger in total. It is natural that a smaller number of accesses is more preferable in order to display the image quicker.

In the above description, only one example was described. However, even in triangles in other forms, there is often such a difference in the number of accesses between the division according to the present invention and the division according to a conventional method, although the difference may be large or small.

<Supplemental Remarks>

The image rendering apparatus according to the present invention was described based on the foregoing embodiment. However, it would be appreciated that embodiments of the image rendering apparatus are not limited to this. Hereinafter, modified examples thereof are described.

(1) In the foregoing embodiment, a triangle was described as an example. However, a polygon may not be a triangle. For example, a polygon may be a quadrangle. As described above, a polygon is often either one of a triangle and a quadrangle in the domain of 3DCG.

A method for dividing a quadrangle is briefly described with reference to FIGS. 11 to 13.

Figure 11:
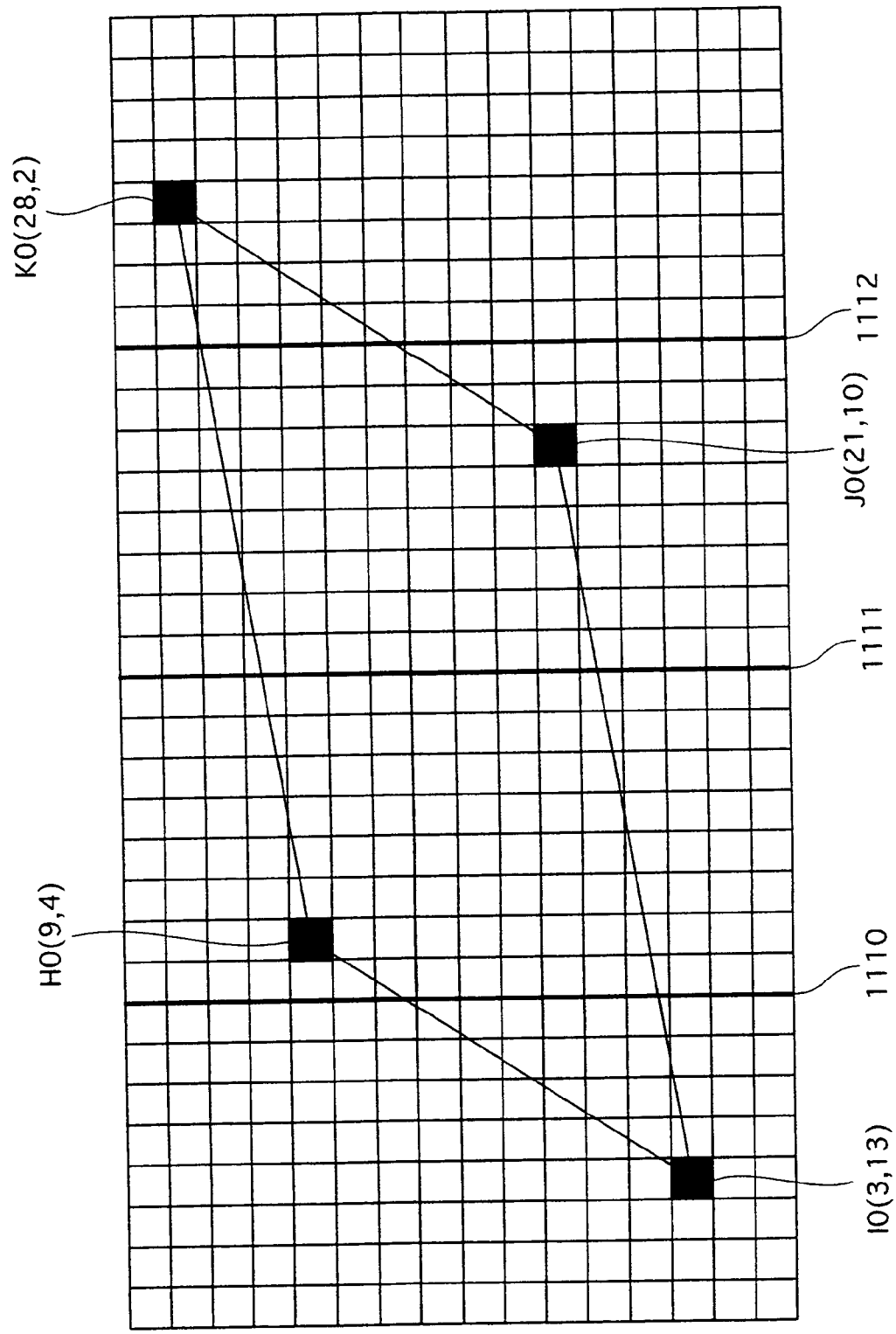
FIG. 11 is a diagram showing a quadrangle that is to be divided.

FIG. 11 shows a state in which data of a polygon in the shape of a quadrangle is stored in the frame memory based on an instruction to render the polygon, the instruction being given from the CPU to the GE.

A method for dividing a quadrangle as shown in FIG. 11 is described. In conventional examples, the GE 120 divides the quadrangle into quadrangles in a size of approximately one fourth, by line segments connecting the middle points of sides that are opposed to each other, as shown in FIG. 13. However, an effect of the present invention is achieved by dividing the quadrangle such that the division points are on boundaries between writing units to the frame memory. Thus, the GE 120 divides the quadrangle in the manner as in FIG. 12.

The GE 120 takes a pixel at a boundary between writing units to the frame memory on each side as a division point on the side. Furthermore, as the last division point, the GE 120 takes a pixel on a boundary between writing units to the frame memory and in the vicinity of the centroid of the original quadrangle. The last division point is selected such that the distance to the centroid is shortest. However, in order to easily select the last division point, the GE 120 may select, as the last division point, the middle point of a line segment connecting two division points on the horizontal sides. The GE 120 creates four new quadrangles by connecting this division point and the division points on the sides. The original quadrangle is represented with the four new quadrangles that have been formed.

Figure 12:
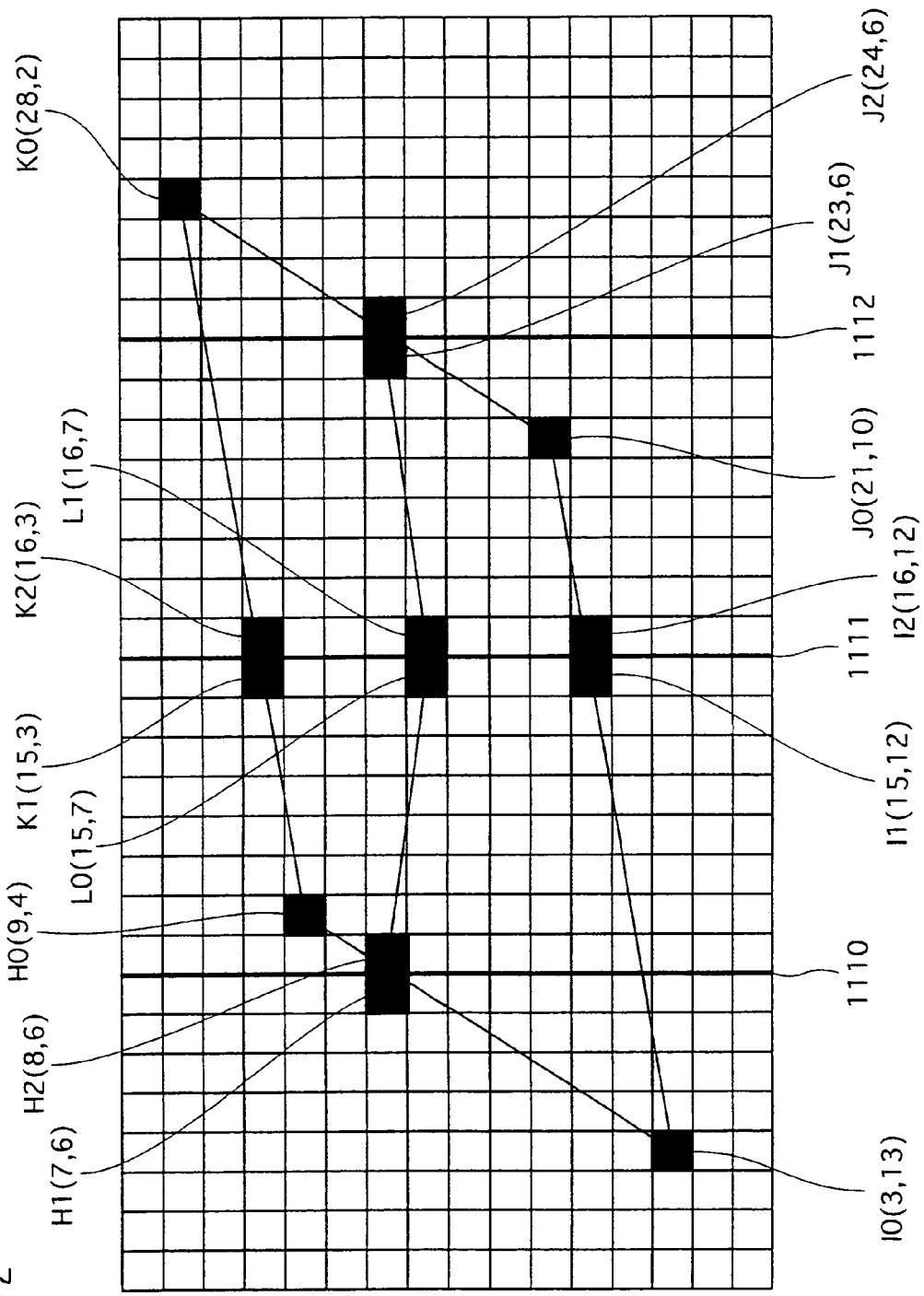
FIG. 12 is a diagram in which the quadrangle has been divided by the image rendering apparatus according to the present invention.

FIG. 12 shows that the original quadrangle H0I0J0K0 shown in FIG. 11 is constituted by four divided quadrangles, that is, a quadrangle H0H2L0K1, a quadrangle H1I0I1L0, a quadrangle L1I2J0J2, and a quadrangle K2L1J2K0. In this case, the number of accesses to the frame memory is 39 times for the entire quadrangle H0I0J0K0.

Figure 13:
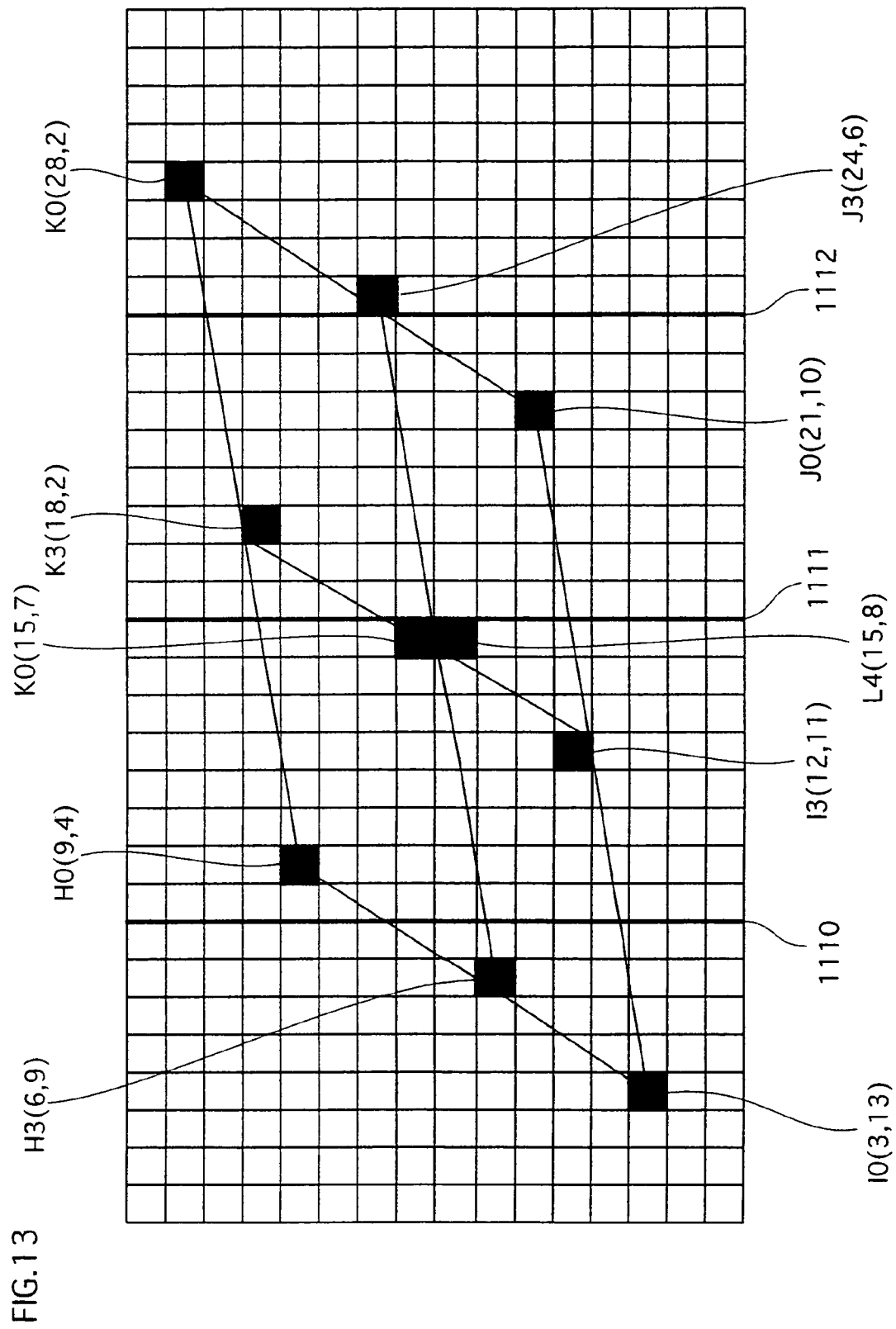
FIG. 13 is a diagram in which the quadrangle has been divided using a conventional technique.

FIG. 13 is a diagram showing the case in which the original quadrangle H0I0J0K0 shown in FIG. 11 is divided at the middle points. As shown in FIG. 13, the original quadrangle H0I0J0K0 is constituted by four quadrangles, that is, a quadrangle H0H3L3K3, a quadrangle H3I0I3L4, a quadrangle L4I3J0J3, and a quadrangle K3L3J3K0. In this case, the number of accesses to the frame memory is 50 times for the entire quadrangle H0I0J0K0.

In this manner, there is a difference in the number of accesses also in the case of a quadrangle. Thus, when the GE 120 divides an original quadrangle and writes data thereof, an effect of reducing the number of accesses as that for a triangle is expected also for a quadrangle. When the number of accesses is reduced, the GE 120 can render a polygon more quickly. Thus, there is a less delay in displaying an image on the display device.

(2) In the foregoing embodiments, the GE 120 divided a polygon only once. However, the number of the division is not necessarily one. The GE 120 may further divide the polygon. For example, the GE 120 may divide a polygon for a predetermined number of times, or may divide a polygon for a number of times that changes depending on the scale. Alternately, the GE 120 may successively divide polygons until no polygon straddles a boundary of 8-pixel units.

Figure 14:
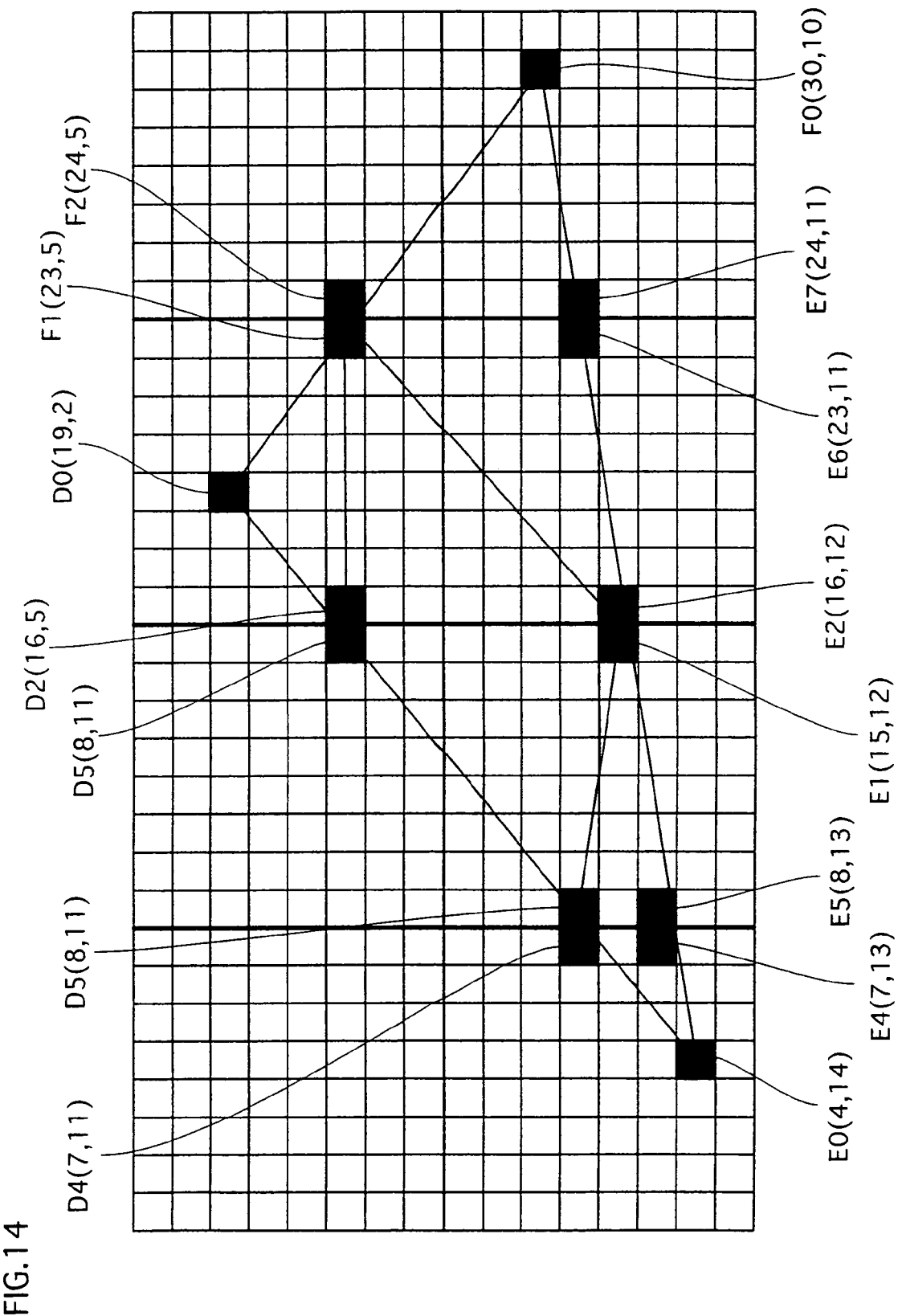
FIG. 14 is a diagram showing an example in which the triangle has been further divided.

FIG. 14 shows one example thereof. In FIG. 14, the GE 120 further divides the triangle D0E0F0 shown in FIG. 6. In FIG. 6, data of the triangle D1E0E1 and the triangle F2E2F0 is stored in the frame memory in a state where the triangles straddle a boundary of 8-pixel units, and thus the GE 120 writes the data in an inefficient manner. For this reason, the GE 120 further divides the triangles. Both of a side D1E0 and a side E0E1 intersect a boundary between writing pixel units. Thus, the GE 120 takes the intersecting points as the division points. The GE 120 divides the triangle D1E0E1 into three triangles, that is, a triangle D4E0E4, a triangle D5E5E1, and a triangle D1D5E1. On the other hand, the GE 120 may divide the triangle F2E2F0 into a triangle F1E2E6 and a triangle F2E7F0. By dividing the triangles in this manner, the GE 120 can render a smoother image. Furthermore, each of the triangles created through the division has at least one vertex at the first pixel or the last pixel in a writing pixel unit. Thus, the manner in which the GE 120 writes the data is not inefficient.

Furthermore, the GE 120 may determine the number of divisions, depending on a desired degree of smoothness of representation. Generally, an object closer to the viewpoint looks finer, and an object farther from the viewpoint looks rougher. Considering this fact, the GE 120 may increase the number of divisions for a portion closer to the viewpoint, and may reduce the number of divisions for a portion farther from the view point. Accordingly, the GE 120 can reduce the number of divisions for a portion far from the viewpoint while providing smooth representation to a portion close to the viewpoint. Thus, the burden on the GE can be reduced.

(3) In the foregoing embodiments, the frame memory stored 640×480 pixels. However, the number of pixels is not necessarily 640×480. For example, the frame memory may store 1280×960 pixels or 1024×768 pixels.

Furthermore, the frame memory may store 240×320 pixels such that the frame memory can be used for a display of a portable phone.

Furthermore, a memory may be used for various displays in a following manner. First, a memory with a large capacity (such as a memory compatible with a definition of 1600× 1200) is prepared. Then, the usage range is changed depending on the definition of each display.

(4) The components constituting the image rendering apparatus shown in the foregoing embodiments may be realized as part or whole of LSI (large scale integration), VLSI (very large scale integration), or the like. The components may be realized as a plurality of LSIs or a combination of one or a plurality of LSIs and another circuit.

(5) In the foregoing embodiments, a polygon was divided by the GE. However, a polygon may be divided based on a program. For example, the image rendering apparatus specifically refers to a computer system that is constituted by components such as a microprocessor, a ROM, a RAM, a hard disk unit, a display unit, a keyboard, and a mouse. The RAM or the hard disk unit stores a computer program. When the microprocessor operates based on the computer program, the apparatus realizes its function.

(6) In the foregoing embodiments, the number of pixels whose data is written at a time was determined based on the number of bus lines between the GE and the frame memory. However, there is no limitation to this. For example, in burst transfer, which is a method for transferring successive data at a high speed without specifying an address and the like, the number of pixels whose data is written at a time may be the number obtained by subtracting the number of data points per pixel from the amount of data that can be transferred in a single burst transfer.

(7) In the foregoing embodiments, a simple example was described regarding an instruction to render, in red, a triangle formed by the three points D0, E0, and F0. However, it is also possible that the three points respectively have color information and the triangle formed by the three points is rendered in an average color of the colors of the three points. Furthermore, the hue may be changed depending on the position of a light source. These functions are realized also in a conventional GE.

(8) In the foregoing embodiments, the GE 120 had a function to write pixel data to the frame memory 130 in the unit of eight pixels at a time. However, the GE 120 may further have a function to write pixel data in the unit of only one pixel.

(9) In the foregoing embodiments, as one example of original data that is to be rendered, coordinate data was shown as in FIG. 4. However, the original data may be expressed by a computing equation that expresses the original object, for example.

(10) In the foregoing embodiments, a series of operations may be realized by executing one or a plurality of programs and linking the operations.

INDUSTRIAL APPLICABILITY

The image rendering apparatus according to the present invention can be used for game machines and the like as an apparatus that displays a 3-dimensional image.

The invention claimed is:

1. An image rendering apparatus for rendering an object specified by a data group using computer graphics, the image rendering apparatus comprising:

a frame memory, divided into sections each constituted by a predetermined number of pixels, for storing pixel data values of the pixels on a 2-dimensional plane;

a writing unit having a function to write pixel data to the frame memory in order to render an image, such that the pixel data is written to the predetermined number of pixels simultaneously;

a data selecting unit for selecting a plurality of data pieces such that at least one vertex of each polygon is positioned at a first pixel or a last pixel in the sections; and an initial data selecting unit for selecting data for vertices of a polygon regardless of the first pixel or the last pixel in the sections, wherein the image rendering apparatus extracts a position component and another component with respect to each of the plurality of data pieces of the data group, the position component being obtained through projection onto the 2-dimensional plane and the other component specifying a rendering condition, and renders a plurality of polygons, having vertices specified by the position component of the data piece in the rendering condition, on an image plane, the rendering condition being specified by the other component for specifying the rendering condition for the data piece, and when the data selecting unit selects data to perform subdivision such that at least two small polygons, each having a same number of sides as an original polygon, constitute the original polygon, the original polygon being formed by data that has been selected by the initial data selecting unit, the data selecting unit selects data for vertices of the small polygons such that one vertex of one small polygon and one vertex of another small polygon are positioned respectively at the first pixel and the last pixel in the adjacent sections, the vertices being in contact with each other.

2. The image rendering apparatus according to claim 1, wherein the data selecting unit selects data for vertices such that at least two vertices are positioned both at the first pixels or the last pixels in the sections, such that if the two vertices are positioned at the first pixels, then all pixels on a line segment formed by connecting the two vertices are positioned at the first pixels, and such that if the two vertices are positioned at the last pixels, then the all the pixels are positioned at the last pixels.

3. The image rendering apparatus according to claim 1, wherein the original polygon is a triangle, and the data selecting unit selects data for one point on each side of the triangle, three points in total, and divides the original polygon by line segments formed by connecting two points among the three points, so that four triangles created through the division constitute the original polygon.

4. The image rendering apparatus according to claim 1, wherein
the original polygon is a quadrangle, and
the data selecting unit selects data for one point on each side of the original polygon, four points in total, and data for one point inside the original polygon, and divides the original polygon by line segments formed by connecting the one point and the four points, so that four quadrangles created through the division constitute the original polygon.

5. The image rendering apparatus according to claim 1, wherein the data selecting unit selects data for one vertex of the small polygons such that the one vertex is in a vicinity of a middle point of a side of the original polygon, the vertex being present on the side.

6. The image rendering apparatus according to claim 5, wherein
the original polygon is a triangle, and
the data selecting unit selects data for one point on each side of the triangle, three points in total, and divides the original polygon by line segments formed by connecting two points among the three points, so that four triangles created through the division constitute the original polygon.

7. The image rendering apparatus according to claim 5, wherein
the original polygon is a quadrangle, and
the data selecting unit selects data for one point on each side of the original quadrangle, four points in total, and data for one point inside the original polygon, and divides the original polygon by line segments formed by connecting the one point and the four points, so that four quadrangles created through the division constitute the original polygon.

8. The image rendering apparatus according to claim 1, wherein the predetermined number of pixels is obtained by dividing a number of signal lines by a number of data bits constituting one pixel, the signal lines being connected to the frame memory and used for inputting and outputting data.

9. The image rendering apparatus according to claim 1, wherein in a case where data is written to the frame memory using burst transfer, the predetermined number of pixels is obtained by dividing a number of bits in a unit of data that is to be transferred in the burst transfer, by a number of bits per pixel.

10. A method for selecting a vertex of a polygon in an image rendering apparatus for rendering an object specified by a data group using computer graphics, wherein the image rendering apparatus comprises a frame memory divided into sections each constituted by a predetermined number of pixels, and a writing unit, the frame memory being for storing pixel data values of pixels on a 2-dimensional plane, and the writing unit having a function to write pixel data to the frame memory in order to render an image, such that the pixel data is written to the predetermined number of pixels simultaneously, the image rendering apparatus extracting a position component and another component with respect to each of a plurality of data pieces of the data group, the position component being obtained through projection onto the 2-dimensional plane and the other component specifying a rendering condition, and rendering a plurality of polygons, having vertices specified by the position component of the data piece in the rendering condition, on an image plane, the rendering condition being specified by the other component for specifying the rendering condition for the data piece, the method further selecting a vertex comprising:

a data selecting step of selecting the plurality of data pieces such that at least one vertex of each polygon is positioned at a first pixel or a last pixel in the sections; and an initial data selecting step for selecting data for vertices of a polygon regardless of the first pixel or the last pixel in the sections, wherein when the data selecting step selects data to perform subdivision such that at least two small polygons, each having a same number of sides as an original polygon, constitute the original polygon, the original polygon being formed by data that has been selected by the initial data selecting step, the data selecting step selects data for vertices of the small polygons such that one vertex of one small polygon and one vertex of another small polygon are positioned respectively at the first pixel and the last pixel in the adjacent sections, the vertices being in contact with each other.

11. A non-transitory computer-readable recording medium having stored thereon a computer-executable program for selecting a vertex for an image rendering apparatus for rendering an object specified by a data group using computer graphics, wherein the image rendering apparatus comprises a frame memory divided into sections each constituted by a predetermined number of pixels, and a writing unit, the frame memory being for storing pixel data values of pixels on a 2-dimensional plane, and the writing unit having a function to write pixel data to the frame memory in order to render an image, such that the pixel data is written to the predetermined number of pixels simultaneously, the image rendering apparatus extracting a position component and another component with respect to each of a plurality of data pieces of the data group, the position component being obtained through projection onto the 2-dimensional plane and the other component specifying a rendering condition, and rendering a plurality of polygons, having vertices specified by the position component of the data piece in the rendering condition, on an image plane, the rendering condition being specified by the other component for specifying the rendering condition for the data piece, the method for selecting a vertex comprising:

a data selecting step of selecting the plurality of data pieces such that at least one vertex of each polygon is positioned at a first pixel or a last pixel in the sections; and an initial data selecting step for selecting data for vertices of a polygon regardless of the first pixel or the last pixel in the sections, wherein when the data selecting step selects data to perform subdivision such that at least two small polygons, each having a same number of sides as an original polygon, constitute the original polygon, the original polygon being formed by data that has been selected by the initial data selecting step, the data selecting step selects data for vertices of the small polygons such that one vertex of one small polygon and one vertex of another small polygon are positioned respectively at the first pixel and the last pixel in the adjacent sections, the vertices being in contact with each other.

12. An integrated circuit for rendering an object specified by a data group using computer graphics, the integrated circuit comprising:

a frame memory, divided into sections each constituted by a predetermined number of pixels, for storing pixel data values of the pixels on a 2-dimensional plane;

a writing unit having a function to write pixel data to the frame memory in order to render an image, such that the pixel data is written to the predetermined number of pixels simultaneously;

a data selecting unit for selecting a plurality of data pieces such that at least one vertex of each polygon is positioned at a first pixel or a last pixel in the sections; and an initial data selecting unit for selecting data for vertices of a polygon regardless of the first pixel or the last pixel in the sections, wherein the integrated circuit extracts a position component and another component with respect to each of the plurality of data pieces of the data group, the position component being obtained through projection onto the 2-dimensional plane and the other component specifying a rendering condition, and renders a plurality of polygons, having vertices specified by the position component of the data piece in the rendering condition, on an image plane, the rendering condition being specified by the other component for specifying the rendering condition for the data piece, and when the data selecting unit selects data to perform subdivision such that at least two small polygons each having a same number of sides as an original polygon constitute the original polygon, the original polygon being formed by data that has been selected by the initial data selecting unit, the data selecting unit selects data for vertices of the small polygons such that one vertex of one small polygon and one vertex of another small polygon are positioned respectively at the first pixel and the last pixel in the adjacent sections, the vertices being in contact with each other.

* * * * *